United States Patent
Huang et al.

(10) Patent No.: US 8,243,866 B2
(45) Date of Patent: Aug. 14, 2012

(54) ANALOG BAUD RATE CLOCK AND DATA RECOVERY

(75) Inventors: Dawei Huang, San Diego, CA (US); Zuxu Qin, Sunnyvale, CA (US); Drew G. Doblar, San Jose, CA (US); Waseem Ahmad, Union City, CA (US); Dong Joon Yoon, San Jose, CA (US); Osman Javed, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1134 days.

(21) Appl. No.: 12/116,329

(22) Filed: May 7, 2008

(65) Prior Publication Data

US 2009/0224806 A1 Sep. 10, 2009

Related U.S. Application Data

(60) Provisional application No. 61/033,964, filed on Mar. 5, 2008.

(51) Int. Cl.
*H04L 7/00* (2006.01)
*H04L 27/06* (2006.01)

(52) U.S. Cl. ........................................ 375/355; 375/340

(58) Field of Classification Search .................. 375/354, 375/355, 316, 340, 256
See application file for complete search history.

(56) References Cited

U.S. PATENT DOCUMENTS

| | | | | |
|---|---|---|---|---|
| 4,234,957 A | * | 11/1980 | Tracey et al. | 375/332 |
| 2008/0069199 A1 | * | 3/2008 | Chen et al. | 375/233 |
| 2008/0191910 A1 | * | 8/2008 | Simpson | 341/97 |
| 2008/0219390 A1 | * | 9/2008 | Simpson et al. | 375/355 |
| 2009/0310665 A1 | * | 12/2009 | Agazzi et al. | 375/229 |

OTHER PUBLICATIONS

Kurt Mueller, "Timing Recovery in Digital Synchronous Data Receiver," 1976, IEEE Transaction on Comm., pp. 516-531.*
Faisal et al., "High Speed Baud Rate Clock and Data Recovery," 2007, IEEE, 64-69.*

* cited by examiner

*Primary Examiner* — Tesfaldet Bocure
(74) *Attorney, Agent, or Firm* — Osha Liang LLP

(57) ABSTRACT

An analog baud rate clock and data recovery apparatus includes a first track and hold circuit that delays a received signal by one unit interval to create an odd signal; a second track and hold circuit that delays the received signal by one unit interval to create an even signal; a first comparator circuit; and a second comparator circuit. The first track and hold circuit outputs the odd signal to the first comparator circuit and the second comparator circuit. The second track and hold circuit outputs the even signal to the first comparator circuit and the second comparator circuit. The first comparator adds the odd signal to the even signal and outputs a first potential timing error. The second comparator subtracts the odd signal and the even signal and outputs a second potential timing error signal. A desired timing error signal is derived from the first and second potential timing error signals. The desired timing error signal is used to determine whether signal sampling is early or late.

18 Claims, 11 Drawing Sheets

Table 1: Truth Table for COMP_SEL and VALID_VOTE

| 1 | 2 | 3 | 4 | 5 | 6 | 7 | 8 | 9 |
|---|---|---|---|---|---|---|---|---|
| X(n+1) | X(n) | X(n-1) | X(n-2) | A=XOR(X(n+1), X(n)) | COMP_SEL=XOR(X(n), (X(n-1)) | VALID_VOTE=XOR(A,COMP_SEL) | Y(n)-Y(n-1) | Y(n)+Y(n+1) |
| 1 | 1 | 1 | 1 | 0 | 0 | 0 | - | - |
| 1 | 1 | 1 | 0 | 0 | 0 | 0 | - | - |
| 1 | 1 | 0 | 1 | 0 | 1 | 1 | - | 2h(-1) |
| 1 | 1 | 0 | 0 | 0 | 1 | 1 | - | 2h(-1)-2h(1) |
| 1 | 0 | 1 | 1 | 1 | 1 | 0 | - | - |
| 1 | 0 | 1 | 0 | 1 | 1 | 0 | - | - |
| 1 | 0 | 0 | 1 | 1 | 0 | 1 | 2h(-1)-2h(1) | - |
| 1 | 0 | 0 | 0 | 1 | 0 | 1 | 2h(-1) | - |
| 0 | 1 | 1 | 1 | 1 | 0 | 1 | -2h(-1) | - |
| 0 | 1 | 1 | 0 | 1 | 0 | 1 | -2h(-1)+2h(-1) | - |
| 0 | 1 | 0 | 1 | 1 | 1 | 0 | - | - |
| 0 | 1 | 0 | 0 | 1 | 1 | 0 | - | - |
| 0 | 0 | 1 | 1 | 0 | 1 | 1 | - | -2h(-1)+2h(1) |
| 0 | 0 | 1 | 0 | 0 | 1 | 1 | - | -2h(-1) |
| 0 | 0 | 0 | 1 | 0 | 0 | 0 | - | - |
| 0 | 0 | 0 | 0 | 0 | 0 | 0 | - | - |

Note 1, Column 8 and 9 are calculated based on following equations:
$Y(n)=h(-1)X(n+1)+h(0)X(n)+h(1)x(n-1)$, $Y(n-1)=h(-1)X(n)+h(0)X(n-1)+h(1)x(n-2)$

*FIG. 2a*

Table 2: Early and Late Vote

| COMPi | X(n+1) | H(-1) | Vote |
|---|---|---|---|
| 1 | 1 | >0 | Late |
| 1 | 0 | <0 | Early |
| 0 | 1 | <0 | Early |
| 0 | 0 | >0 | Late |

Table 3: Comparison Selection

| COMP_SEL | COMP |
|---|---|
| 0 | COMP1 |
| 1 | COMP 2 |

| COMP1 | X(n+1) | H(-1) | Vote |
|---|---|---|---|
| 1 | 1 | >0 | Late |
| 1 | 0 | <0 | Early |

| COMP1 | X(n+1) | H(-1) | Vote |
|---|---|---|---|
| 0 | 1 | <0 | Early |
| 0 | 0 | >0 | Late |

| COMP2 | X(n+1) | H(-1) | Vote |
|---|---|---|---|
| 1 | 1 | >0 | Late |
| 1 | 0 | <0 | Early |
| 0 | 1 | <0 | Early |
| 0 | 0 | >0 | Late |

| COMP_SEL | COMP |
|---|---|
| 0 | COMP1 |
| 1 | COMP2 |

*FIG. 2b*

ANALOG BAUD RATE CLOCK AND DATA RECOVERY

BACKGROUND OF THE DISCLOSURE

1. Field of the Disclosure

Embodiments of the present disclosure relate to an analog baud-rate Mueller-Muller algorithm based clock and data recovery (CDR).

2. Description of the Related Art

Integrated circuits (IC) may need to communicate with other ICs or modules in any given system design. The ever increasing processing and computation speed of ICs has created a growing demand for high-bandwidth input and output (IO) on these ICs, which is achieved by increasing the signaling rate of each IO pin as well as increasing the number of IO pins on the chip. Today internal circuits can run at 10's of Gbps, but the performance of the link is limited by the characteristics of the channel, namely, the electrical path from one IC die to the other. In order to achieve desired data rates over existing channels, many multi-Gbps links use complex signal processing to overcome the channel limitations. One such example for improving performance of IOs is to change the signaling method and the channel media by using high speed serialized deserialized links (SERDES). These circuits convert data between serial data and parallel interfaces in each direction.

Implementations of SERDES are sometimes combined with implementations of encoding/decoding circuits. The purpose of encoding/decoding is typically to place at least statistical bounds on the rate of signal transitions to allow for easier clock recovery in the receiver, to provide framing, and to provide DC balance. A common coding scheme used with SERDES is 8B/10B encoding. This supports DC-balance, provides framing, and guarantees transitions. The guaranteed transitions allow a receiver to extract the embedded clock. The control codes allow framing, typically on the start of a packet.

The 8 B/10 B SERDES parallel side interfaces may have 1 clock line, 1 control line and 8 data lines, however it may have the clock and control lines integrated in the data lines. Another common coding scheme used with SERDES is 64 B/66 B encoding. This scheme statistically delivers DC-balance and transitions. Framing is delivered through the deterministic transitions of the added framing bits. Also, SERDES can be implemented in combination with pseudo-random binary sequence (PRBS) scrambling data. There exist a number of other coding schemes that could also be used to implement SERDES that provide the necessary transitions for clock extraction.

A clock and data recovery (CDR) circuit is used to align sampling clock at the receiver with incoming data adaptively and is critical for high speed serialized deserialized link (SERDES). Working with a received signal can pose the issues of clock recovery and optimum phase selection. Clock recovery is the process of synchronizing a receiver clock with the transmitter clock used when the signal was generated. Phase selection is the process of selecting a phase with respect to the receiver clock at which to sample the received signal. Such a phase selection is acceptable when it provides a good signal-to-noise ratio (SNR) for accurate data recovery from the received signal. The process of clock recovery, and sometimes phase selection as well, is called clock and data recovery. This is a useful ability because it allows a designer to avoid worrying about tracing lengths and delays and attempting to match them for all parallel data streams. The concerns that are raised are those of area, power, and latency of the implemented CDR.

Many clock and data recovery schemes today use a phase lock loop (PLL). This method is costly both in area and power because PLLs are known to consume a relatively large amount depending on the application. Another method of CDR is 2×-oversampling the data. When data rates are slower (less than 5 or 6 Gbps), a popular choice of CDR is bang-bang CDR, which relies on 2×-oversampling of the incoming data. As the data rate goes up to 10 Gbps and above, it is no longer practical to do oversampling at the required timing accuracy.

Thus, a baud rate CDR (no oversampling) is a preferred method. Without oversampling, some sort of manipulation (add, subtraction, or comparison) of adjacent incoming data samples is required to extract timing information. One such algorithm for timing extraction is called Mueller-Muller (MM) algorithm which was first described in a journal article in 1975. The MM-algorithm is a method for generating a timing error signal $H(-1)$ (also called a timing error detector). The MM algorithm only requires one sample per symbol. It had been implemented in some applications for long distance telecom. However, for those applications, which at most have 10-12 lanes per ASIC, power, area and latency of the receiver are not major considerations and such applications can afford a fairly sophisticated MM-based CDR with lots of computation. For a modern CPU, the number of high speed lanes is on the order of hundreds, and thus, power, area, and latency of the receiver itself are critical to overall CPU performance. Therefore, it is important to balance the performance, complexity, power usage, and area in the baud rate CDR design.

Digital MM-based CDR uses two front-end 4.5 bit ADCs to digitize the incoming data signal, then applies the MM-algorithm on the digitized data to extract timing info. The big disadvantage of such approach is that it required two very fast ADC front end (6.25 Gbps), which consume lots of power and area. In addition, the accuracy of timing extraction is limited by ADC quantization. Last, this implementation requires the use of TX pre-cursor or RX FFE, which add additional latency to the serial link.

SUMMARY OF THE INVENTION

One or more embodiments of the present invention involve an analog baud rate clock and data recovery apparatus comprising: a first track and hold circuit that delays a received signal by one unit interval to create an odd signal, a second track and hold circuit that delays the received signal by one unit interval to create an even signal; a first comparator circuit; and a second comparator circuit, wherein the first track and hold circuit outputs the odd signal to the first comparator circuit and the second comparator circuit; wherein the second track and hold circuit outputs the even signal to the first comparator circuit and the second comparator circuit; wherein the first comparator adds the odd signal to the even signal and outputs a first potential timing error, wherein the second comparator subtracts the odd signal and the even signal and outputs a second potential timing error signal, wherein a desired timing error signal is derived from the first and second potential timing error signals, and wherein the desired timing error signal is used to determine whether signal sampling is early or late.

One or more embodiments of the present invention involve an analog baud rate clock and data recovery apparatus comprising: a first comparator circuit; a second comparator circuit; a third comparator circuit; a fourth comparator circuit; a pair of track and hold circuits along a main data path that delay the signal creating an odd signal and an even signal in relation to each other and send the odd signal and the even signal to the first, second, third, and fourth comparators; a first track and hold circuit; and a second track and hold circuit, wherein the first and second track and hold circuits receive a signal from the pair of track and hold circuits along the main data path, wherein the first track and hold delays the even signal by one unit interval, wherein the second track and hold delays the odd signal by one unit interval, wherein the first track and hold outputs the delayed even signal to the first and second comparator circuits, wherein the second track and hold outputs the delayed odd signal to the third and fourth comparator circuits, wherein the first comparator subtracts the odd signal to the delayed even signal, wherein the second comparator adds the odd signal and the delayed even signal, wherein the third comparator subtracts the delayed odd signal to the even signal, wherein the fourth comparator adds the delayed odd signal and the even signal, and wherein a timing error signal is derived from the outputs of the comparators and used to determine whether signal sampling is early or late.

One or more embodiments of the present invention involve a method of implementing an analog baud rate clock and data recovery apparatus comprising: receiving a signal for a main data path at a pair of track and hold circuits; delaying the signal by at least half a clock cycle in relation to each of the track and hold circuits in the pair creating an even and odd signal; receiving the even and odd signal from the first and second track and hold circuits at a first, second, third, and fourth comparator and the even signal at a first track and hold circuit and the odd signal at a second track and hold circuit; delaying the even and the odd signal at the first and second track and hold circuits respectively; receiving the delayed even and odd signals at the first, second, third, and fourth comparators; subtracting the odd signal to the delayed even signal at the first comparator; adding the odd signal and the delayed even signal at the second comparator; subtracting the delayed odd signal to the even signal at the third comparator; adding the delayed odd signal and the even signal at the fourth comparator; and deriving a timing error signal from the outputs of the comparators and using the timing error signal to tell the apparatus if signal sampling is early or late.

One or more embodiments of the present invention involve a method of implementing an analog baud rate clock and data recovery apparatus comprising: receiving a signal from the main data path at a first and second track and hold circuits; aligning odd signal and even signals by applying clock signals with one unit interval difference; receiving the odd signal from the first track and hold at the first and second comparators and receiving the even signal from the second track and hold at the first and second comparator; adding the odd signal to the even signal and at the first comparator adds and outputting a first potential timing error; subtracting the odd signal and the even signal from the second comparator and outputting a second potential timing error signal; and deriving a correct timing error signal and using the correct timing error signal to determine whether signal sampling is early or late.

BRIEF DESCRIPTION OF DRAWINGS

FIG. 2a is a truth table.

FIG. 2b is a set of truth tables.

DETAILED DESCRIPTION

Embodiments of the present disclosure will be presented below with reference to the drawings.

The Mueller-Muller (MM) algorithm set the theoretical framework for baud-rate CDR design However, the MM-algorithm does not cover the aspect of implementation with modern very-large-scale integration (VLSI) technology for specific applications. One or more embodiments of the present invention implement an analog baud-rate MM-based CDR.

Figure 1A:
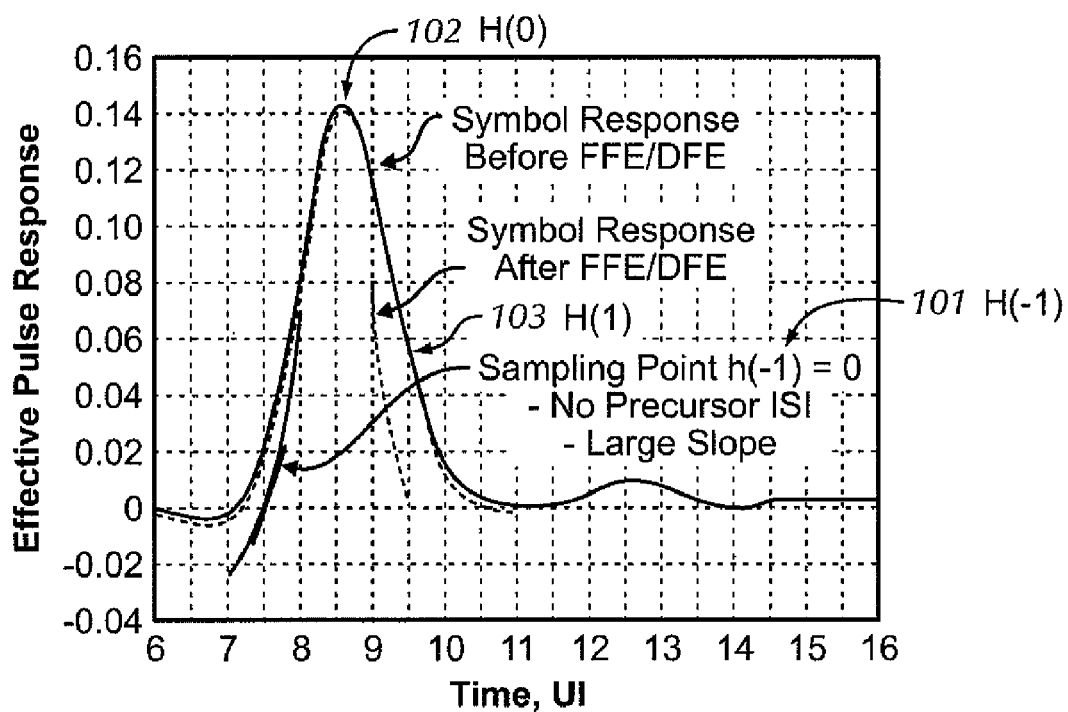
FIG. 1a is a single symbol waveform with sampling points.
Figure 1B:
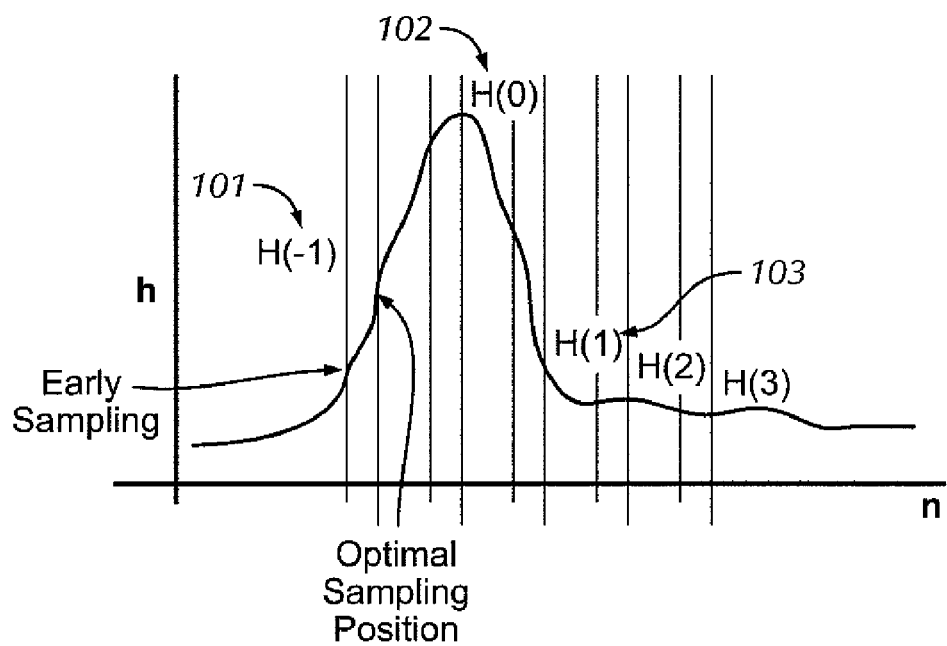
FIG. 1b is a another single symbol waveform with sampling points.

In one or more embodiments of the present invention, for a baud-rate clock and data recovery (CDR) algorithm based on the MM-algorithm approach, an optimal sampling time is that which the precursor $H(-1)$ 101 (also called a timing error signal) of a symbol response is equal to a set threshold. For example, in FIG. 1a, the threshold is set to zero, but this is not necessarily the case for all possible adaptations. It may be desirable to set the threshold to a value slight above zero along the symbol curve. If $H(-1)$ 101 is less than the threshold, then the CDR is sampling the received signal early. If $H(-1)$ 101 is larger than the threshold, then the CDR is sampling the received signal later than desired. Therefore, by extracting the $H(-1)$ 101 information from the incoming data stream, the sampling point of a receiver can lock to the optimal position. An example is shown in FIG. 1a and FIG. 1b.

There are two main reasons for using this type of baud-rate CDR algorithm. First, it is difficult to over-sample the incoming data stream to obtain both data and edge information at 10 Gbps for a traditional bang-bang CDR or over-sampling CDR. Second, with baud rate sampling, the timing information is not readily available. $H(0)$ 102, the cursor of a symbol response, cannot be used for CDR because the optimal sampling point should be close to the peak of $H(0)$ 102 and, therefore, both an early and late sampling point of the received signal will result in lower $H(0)$ 102 making differentiation for a comparator nearly impossible. $H(1)$ 103 cannot be used because whether $H(1)$ 103 crosses the threshold depends on the data channel loss and the equalization strength at receiver.

By using $H(-1)$ 101 as our timing error value indicator, CDR can lock into the optimal sampling point regardless of the equalization strength. Also, using a $H(-1)$ 101 equaling threshold approach reserves the flexibility to lock to any point of the rising edge symbol response. In previous digital implementations, one could only lock to $H(-1)$ 101 equals zero. Thus, the previous approach required a dip crossing zero position at precursor location, which had to be guaranteed by using either precursor tap of TX finite impulse response (FIR) or RX FEE, or both. So, for example, by selecting a point part of the way up the rising edge of the symbol curve as our threshold value for an ideal $H(-1)$ 101, in one or more embodiments as shown in FIG. 1b, when an early sample is taken, that value will be within a range including values above zero up to the threshold value of H(−1) 101.

The extraction of H(−1) from incoming data stream relies on the direct comparison of neighboring data samples (see FIG. 2a, Table 1). There are three methods for such comparison. The first method is to digitize the incoming samples and to compare them to the neighbor in time sample after a one unit interval (UI) delay (1UI). This method is computational intense for 10 Gbps IO applications. The second method is to delay the previous bit for 1UI in an analog domain then use a comparator to compare it with the current bit. The challenge for this method is that the 1UI analog delay has to be accurate in time and have low distortion in amplitude. The third method is to compare the current bit and the previous bit to a common reference, which should be the cursor H(0). The disadvantage of this method is that it relies on an accurate H(0), which also needs to be extracted from incoming data stream.

Figure 3:
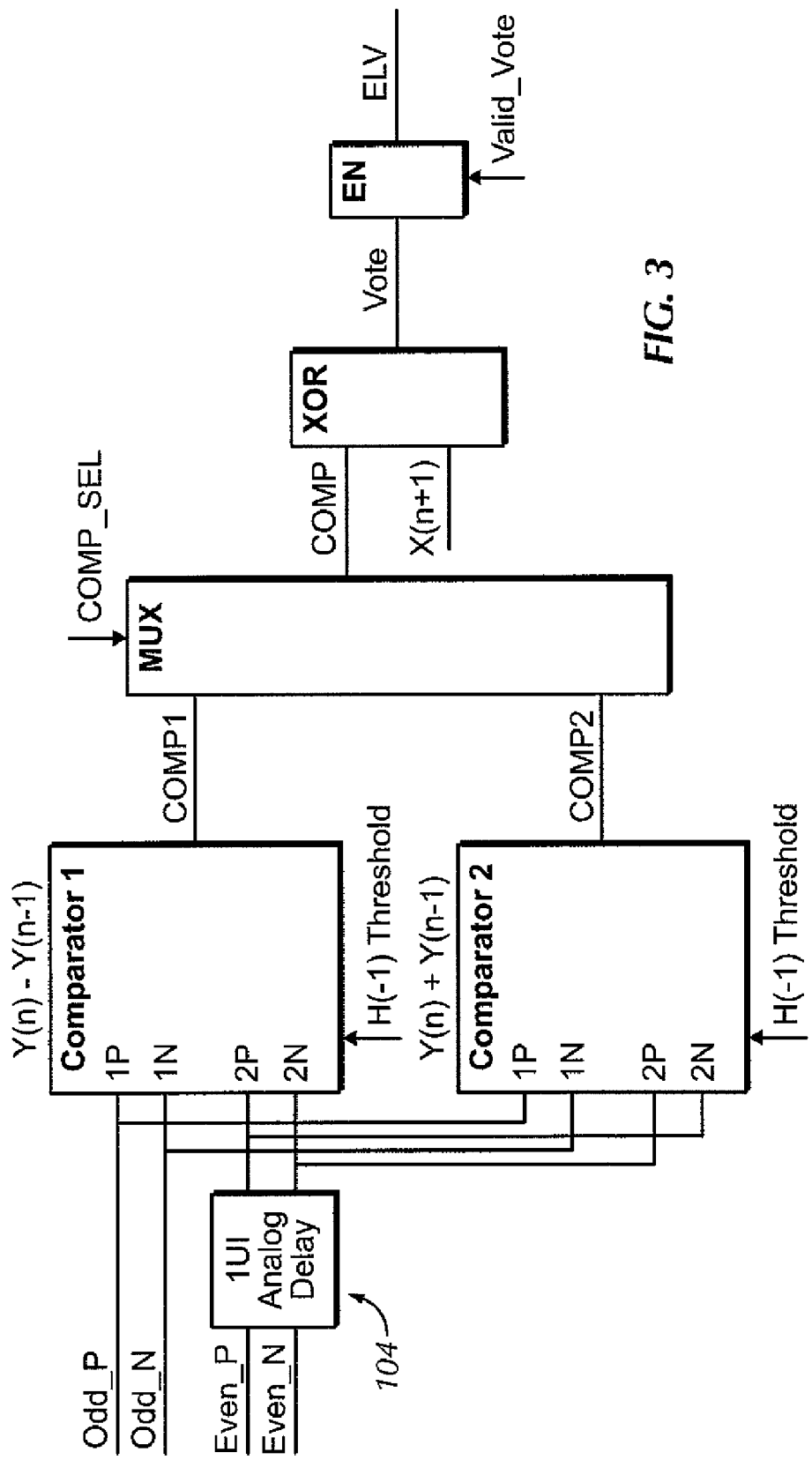
FIG. 3 is a circuit diagram relating to an embodiment of the invention.

In one or more embodiments of the present invention, the implementation chosen is to use a track and hold (TH) circuit as a 1UI analog delay line 104 for the Analog MM CDR. TH tracks an input analog signal during tracking phase and holds the value until the next tracking phase. The tracking rate and linearity of TH is very critical for analog CDR performance. To achieve a high tracking rate, a simple passive TH circuit is used. A current mode logic (CML) type output buffer is optional to drive a large load and to isolate input/TH and consecutive circuits. An analog CDR implementation using a TH circuit as 1UI analog delay element is shown in FIG. 3.

Figure 4A:
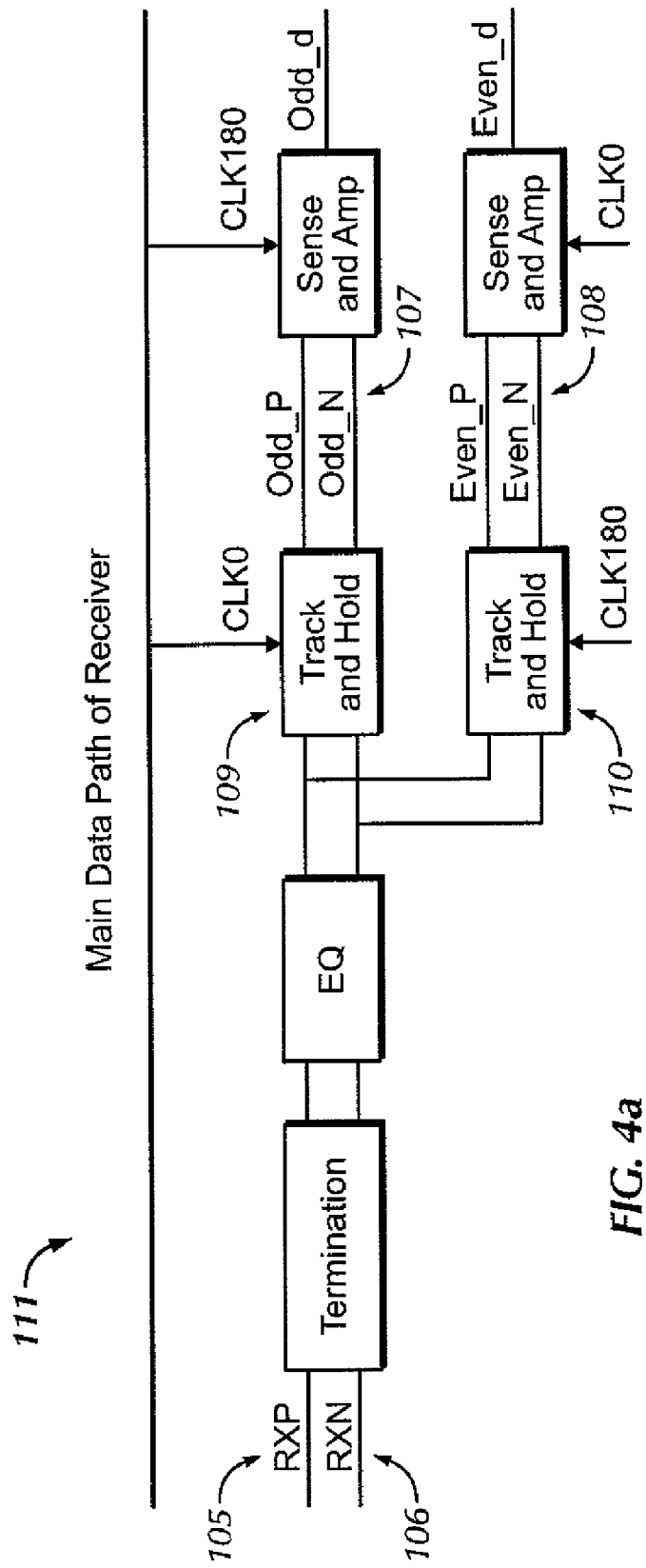
FIG. 4a is a circuit diagram of the main data path that carries the signals for an embodiment of the invention.
Figure 4B:
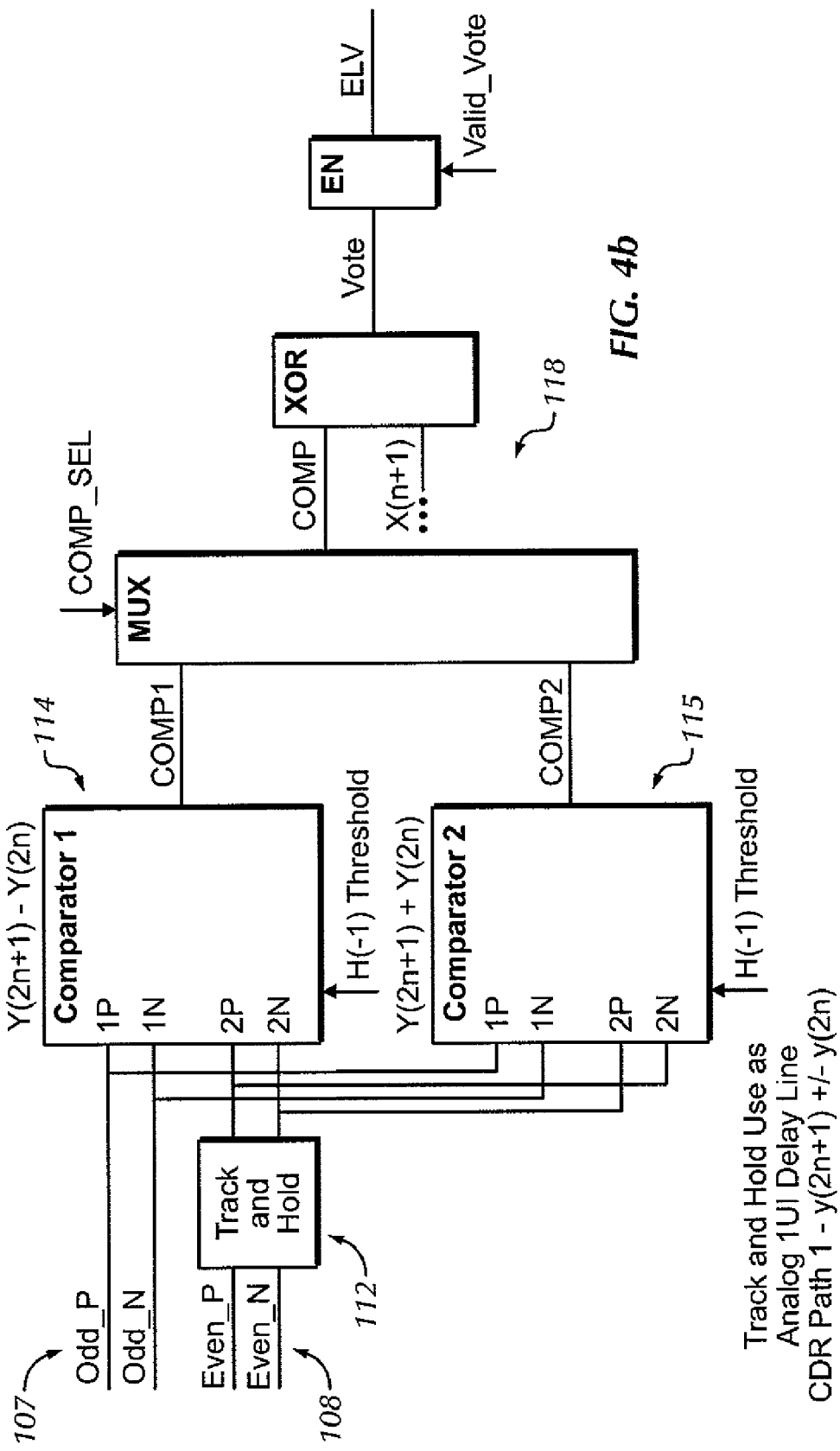
FIG. 4b is a circuit diagram of the first half of the circuit diagram of an embodiment of the invention.
Figure 4C:
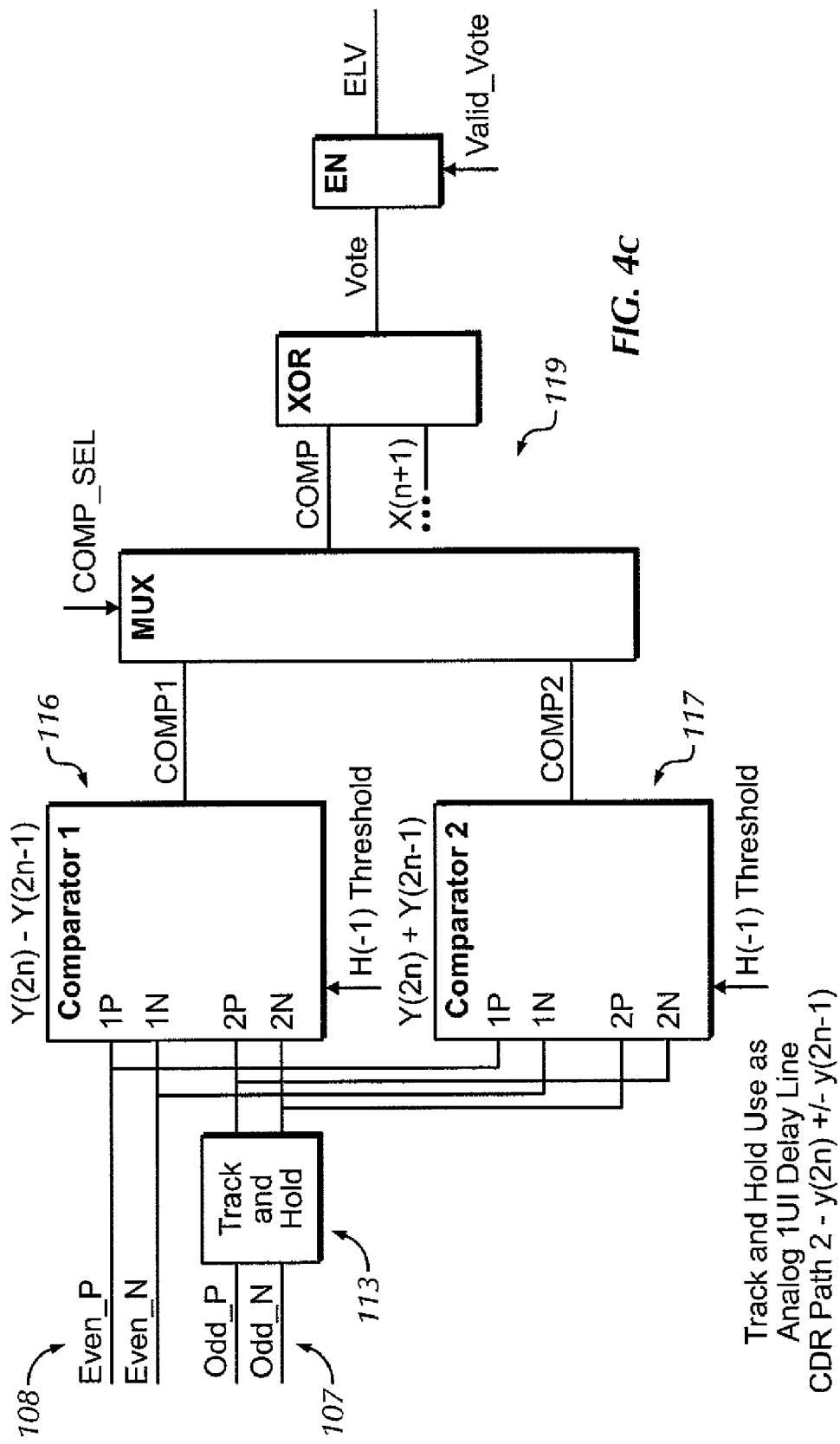
FIG. 4c is a circuit diagram of the second half of the circuit diagram of an embodiment of the invention.

The two TH circuits (109, 110) in FIG. 4a are placed on the main data path 111 to split the incoming data stream received positive signal of a differential pair (RXP) 105 and received negative signal of a differential pair (RXN) 105 into two data streams Odd_P/N 107 and Even_P/N 108. The two data streams Odd_P/N 107 and Even_P/N 108 are then fed into sensing amplifiers which sense and amplify the data streams. The Odd_P/N 107 and Even_P/N 108 signals are then fed in parallel to the analog baud-rate CDR shown in two pieces in FIGS. 4b and 4c. Then, as shown in FIG. 4b, a 1UI analog delay TH circuit 112 is used to delay the Even_P/N 108 data stream for 1UI while maintaining the analog amplitude of the data. Similarly, as shown in FIG. 4c, a 1UI analog delay TH circuit 113 is used to delay the Odd_P/N 107 data stream for 1UI while maintaining the analog amplitude of the data. These enable the addition and subtraction among y(2n+1), y(2n), and y(2n−1) in the form of comparison. After the comparisons are done, one comparison result is selected based on the actual data pattern (see FIG. 1b, Tables 1 and 3) and the early-late vote (see FIG. 1b, Table 2) is tallied, if it is a valid vote (see FIG. 1b, Table 1). The y(n) and y(n−1) signals are defined by the following equations:

$$y(n)=H(-1)x(n+1)+H(0)x(n)+H(1)x(n-1)$$

$$y(n-1)=H(-1)x(n)+H(0)x(n-1)+H(1)x(n-2)$$

as prescribed by the MM-algorithm.

Similarly, y(2n+1), y(2n), and y(2n−1) have like equations, which allow for the solving of H(−1) as shown in the truth table in FIG. 2a, Table 1. Once the H(−1) signal is found in one of the corresponding comparators (114, 115, 116, or 116) it is checked against the threshold H(−1) which is input to all the comparators. To determine which comparator is correct, the outputs are sent through a corresponding multiplexer (MUX) 118, 119. It then follows that the signal undergoes further processing after that as shown in FIGS. 4a and 4b and tracked in FIG. 2a, Table 1. Once the H(−1) signal is found and determined to be late or early, the overall system can then use that output clock information to adjust the sampling in any of the methods well known in the art.

The analog implementation of a baud-rate MM-based CDR is simple in comparison to the alternative schemes with the ability to be implemented with relatively small overhead. Additionally, in one or more embodiments, accuracy is not limited by quantization error because of the analog nature of the overall system. The adjustable threshold H(−1) in the comparator stage eliminates the need for TX pre-cursor and RX FFE or DFE which where necessary in the digital scheme. Eliminating the need for the TX pre-cursor and RX FEE or Decision-Feedback Equalizer (DFE) reduces the latency of the over all design.

There are many different options to implement this algorithm with different levels of timing accuracy and at different power and area costs. For applications that require 100s of SERDES lanes, it is prudent to optimize the implementation for lower power and area. In addition, to obtain best system performance, it is also equally important to have the lowest possible latency through the RX main data path 120.

Figure 5:
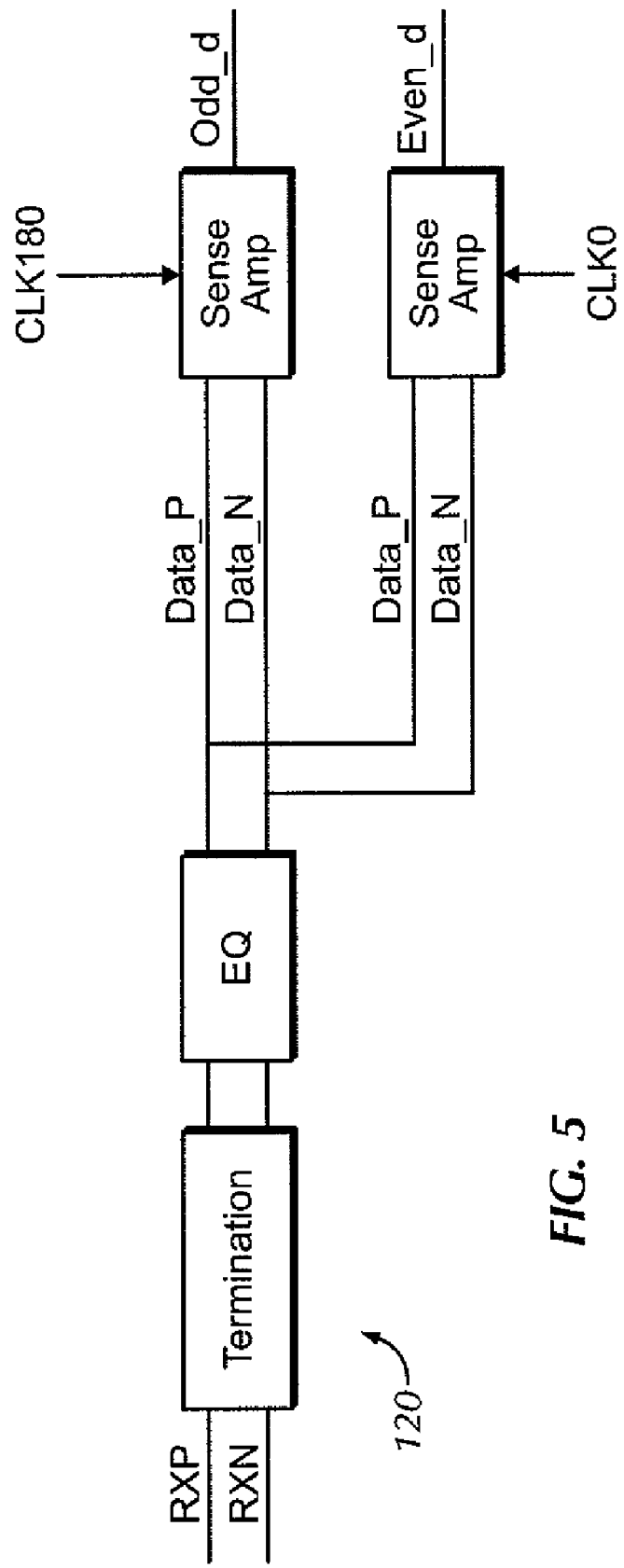
FIG. 5 is a circuit diagram of a main data path for another embodiment of the invention.
Figure 6:
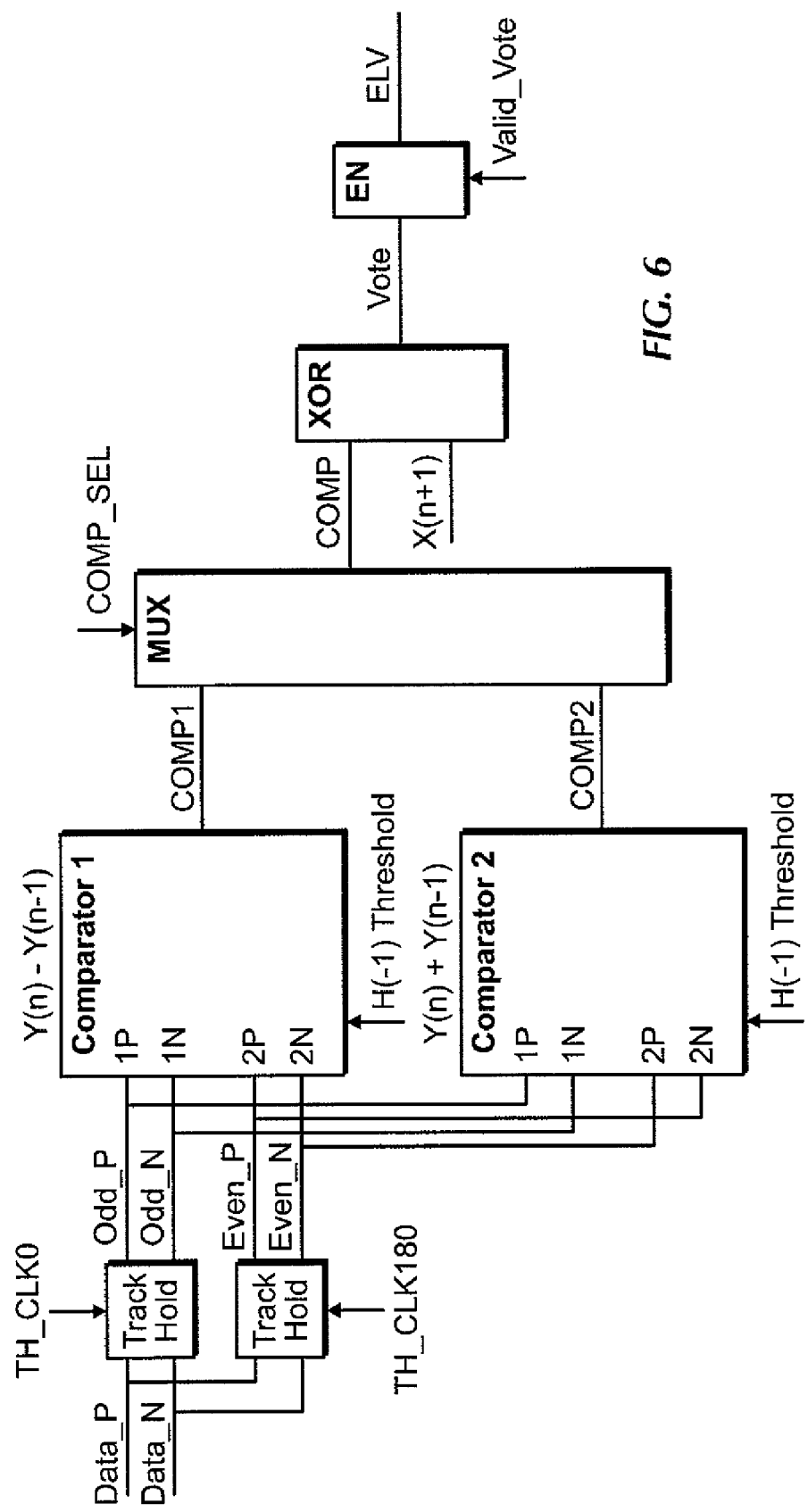
FIG. 6 is a circuit diagram of an embodiment of the invention.

In one or more embodiments of the invention, as shown in FIGS. 5 and 6, the basic operation principle is similar to the above-described embodiments. A difference is the clocks and positioning of the TH circuits. The TH_CLK0 and TH_CLK90 control the track and hold circuits to track only one cycle, but hold N cycles. The TH circuits are derived from, and phased-aligned to, CLK0 and CLK90 respectively. With this Track-One-Hold-N approach, the need for the 1UI analog TH circuit can be eliminated. Further, the TH circuits are placed off the main data path as show in FIGS. 5 and 6. In addition, by using digital control, the TH_CLK0 and TH_CLK90 can be swapped on the fly. This enables the CDR to derive timing info from y(2n+1) and y(2n) as well as combination of y(2n−1) and y(2n) and further allows for y(n) and y(n−1) comparisons without duplicating the whole CDR path as shown in the previously described embodiments, which saves substantial amount of power. Thus, the total number of TH circuits and comparators is also changed from the earlier-described embodiments. In these embodiments, there are two TH circuits and two comparators.

Figure 7:
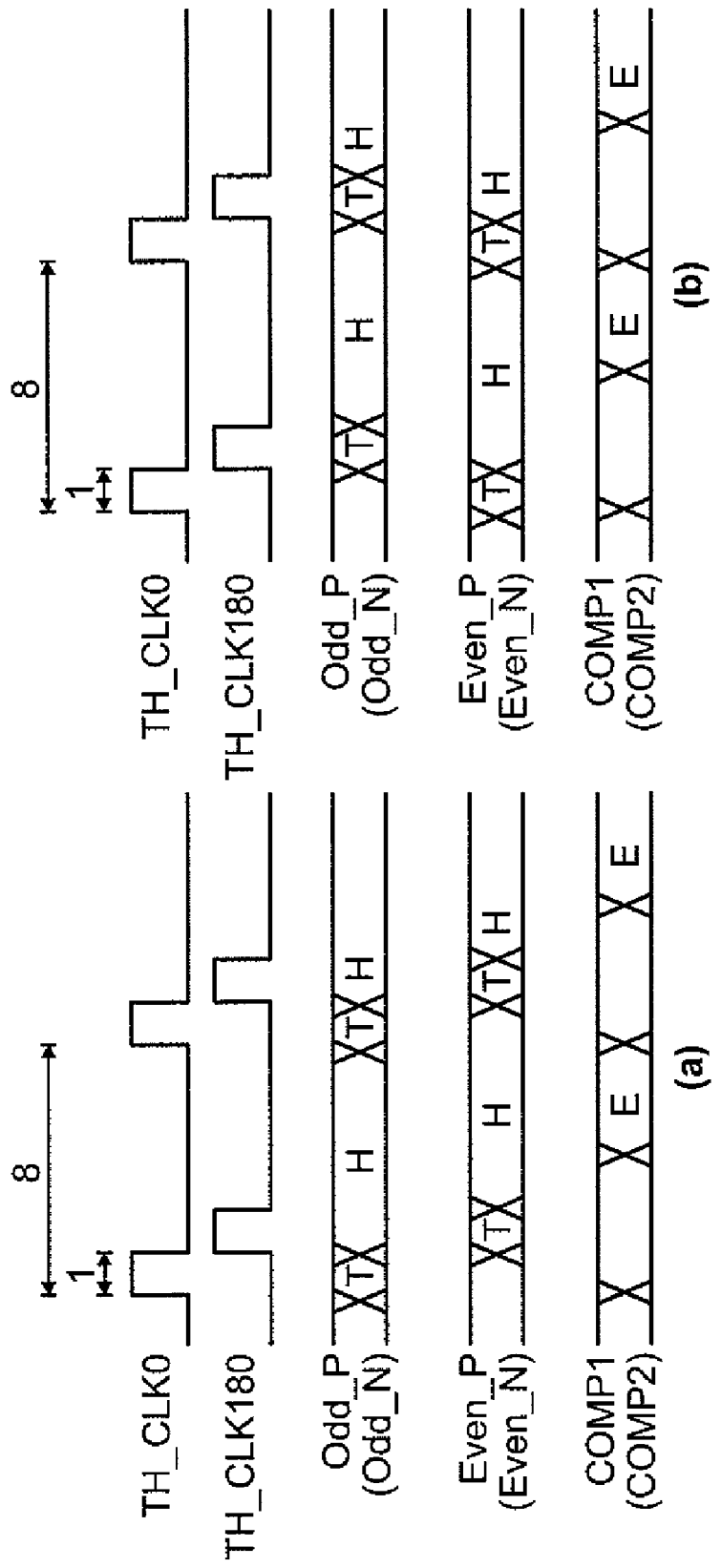
FIG. 7 is a timing diagram showing how the signals travel in one or more embodiments of the invention.

FIG. 5 shows the main data path 120 and CDR path. By applying a sub-rate clock or a clock with non-50% duty cycle to the Track-and-Hold (TH) circuit along the CDR path, it extends the evaluation period for the comparison stage to resolve the difference between two adjacent data samples, which will result in better timing accuracy (FIG. 7). Because the THs are on both odd and even data paths to the comparator, the matching between the two paths is better than the previous embodiment shown in FIGS. 4a, 4b, and 4c. In addition, by switching the clock phase to THs, Y(2n+1)+/−Y(2n) and Y(2n)+/−y(2n−1) can be computed with two comparison stages instead of four stages, as in the previous scheme. Additionally, with a randomly switching clock phase (FIG. 8), harmonic locking can be prevented. Further, the two data streams Data P/N and Data P/N are then fed into sensing amplifiers which sense and amplify the data streams.

An example is shown in FIG. 7 to illustrate the operation with the non-50% duty cycle clock and the switching clock phase. In this particular implementation, the TH_CLK0 and the TH_CLK180 are derived from, and phased-aligned to, CLK0 and CLK180 respectively. This enables the TH circuit to track 1 cycle and hold 7 cycles, which provides longer evaluation time for comparison stage.

Figure 8:
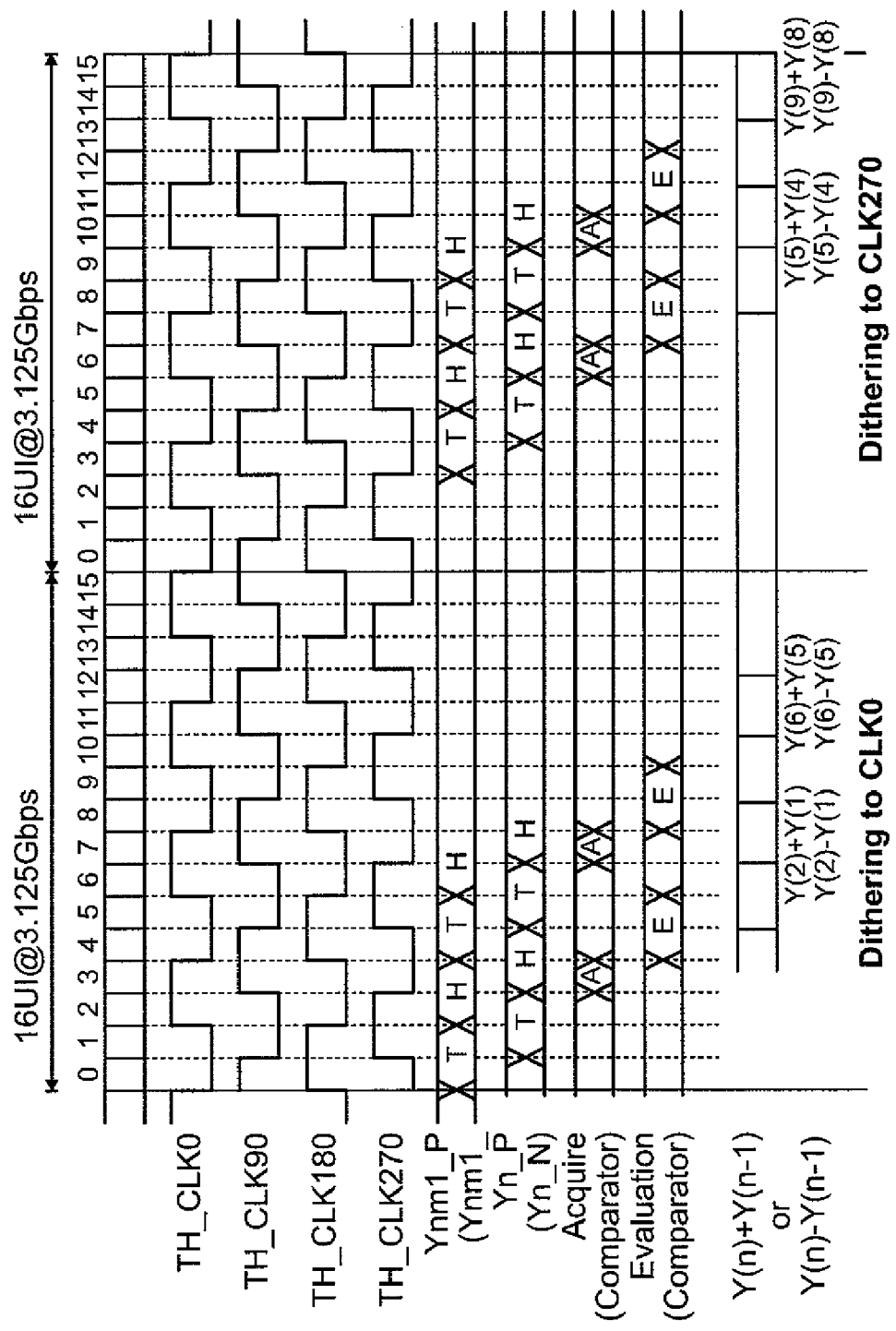
FIG. 8 is a timing diagram showing how an embodiment has variable timing extraction.

Another example is shown in FIG. 8 which illustrates the operation with random switching clock phase. In this particular example, the clock phase switches from 0 to 270. This enables the CDR to extract timing from bit 4, 5, 8, and 9 instead of bit 1, 2, 5, and 6.

One or more embodiments provide further improvements by providing lower latency and lower power for analog clock and data recovery (CDR). In doing so, the major changes of the above-described scheme involve relocating two TH circuits from RX main data path to the Analog CDR circuit.

One or more embodiments of the present invention may have one or more of the following advantages. When placed along the main data path the TH circuit may add a latency of 2UI to the overall processing time. In one or more embodiments, it may be possible to gain back the 2UI latency by not placing any TH circuits along the main data path thereby lowering the latency of the system. In one or more embodiments, 2 TH circuits and at least one 1UI analog delay circuit was needed. The 1UI analog delay circuit could be implemented as a TH circuit thereby requiring roughly three, potentially four, TH circuits. Each of the TH circuits consumes around 10-20 milliwatts (mW). In one or more embodiments, only two TH circuits are needed creating a potential power savings of 20-40 mW per SERDES lane. For applications with hundreds of SERDES lanes, this could translate to 10 s of watts of power saved. For example, only needing two TH circuits and two comparators translates to power saving of around 10-100 mW per lane and potentially higher depending on the comparator usage. In one or more embodiments, the load on the main data path is symmetrical and the analog signals propagate through identical circuit providing for better match in circuit design and layout. Therefore, by having better matching in circuit design and layout in the CDR path the fidelity of the comparison results is improved. With the Track-1-hold-n approach, extra time is allowed for the analog comparator to resolve the voltage difference between the y(n) and y(n−1) samples thereby providing better timing resolution. The improved sensitivity of the analog comparator will result in improved CDR timing resolution. Also, harmonic locking is eliminated because of the dithering in timing extraction.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. An analog baud rate clock and data recovery apparatus comprising:
    a first track and hold circuit that delays a received signal by one unit interval to create an odd signal;
    a second track and hold circuit that delays the received signal by one unit interval to create an even signal;
    a first comparator circuit; and
    a second comparator circuit,
    wherein the first track and hold circuit outputs the odd signal to the first comparator circuit and the second comparator circuit;
    wherein the second track and hold circuit outputs the even signal to the first comparator circuit and the second comparator circuit;
    wherein the first comparator adds the odd signal to the even signal and outputs a first potential timing error,
    wherein the second comparator subtracts the odd signal and the even signal and outputs a second potential timing error signal,
    wherein a desired timing error signal is derived from the first and second potential timing error signals, and
    wherein the desired timing error signal is used to determine whether signal sampling is early or late.

2. The analog baud rate clock and data recovery apparatus of claim 1, wherein the received signal is a low voltage differential signal (LVDS) or current mode logic signal (CML).

3. The analog baud rate clock and data recovery apparatus of claim 1, further comprising:
    a multiplexer for selecting between the comparators first or second timing error signal outputs according to a truth table;
    an XOR; and
    a valid vote check,
    wherein the multiplexer, the XOR, and the valid vote check select the correct timing error signal.

4. The analog baud rate clock and data recovery apparatus of claim 1, wherein the received signal is a serialized signal that is serialized by a SERDES.

5. The analog baud rate clock and data recovery apparatus of claim 4, wherein the SERDES is implemented in combination with 8B/10B encoding.

6. The analog baud rate clock and data recovery apparatus of claim 4, wherein the SERDES is implemented in combination with 64B/66B encoding.

7. The analog baud rate clock and data recovery apparatus of claim 4, wherein the SERDES is implemented in combination with pseudo-random binary sequence (PRBS) scrambling.

8. The analog baud rate clock and data recovery apparatus of claim 1, wherein the unit interval is one half of a clock cycle.

9. An analog baud rate clock and data recovery apparatus comprising:
    a first comparator circuit;
    a second comparator circuit;
    a third comparator circuit;
    a fourth comparator circuit;
    a pair of track and hold circuits along a main data path that delay the signal creating an odd signal and an even signal in relation to each other and send the odd signal and the even signal to the first, second, third, and fourth comparators;
    a first track and hold circuit; and
    a second track and hold circuit,
    wherein the first and second track and hold circuits receive a signal from the pair of track and hold circuits along the main data path,
    wherein the first track and hold delays the even signal by one unit interval,
    wherein the second track and hold delays the odd signal by one unit interval,
    wherein the first track and hold outputs the delayed even signal to the first and second comparator circuits,
    wherein the second track and hold outputs the delayed odd signal to the third and fourth comparator circuits,
    wherein the first comparator subtracts the odd signal to the delayed even signal,
    wherein the second comparator adds the odd signal and the delayed even signal,
    wherein the third comparator subtracts the delayed odd signal to the even signal,
    wherein the fourth comparator adds the delayed odd signal and the even signal, and
    wherein a timing error signal is derived from the outputs of the comparators and used to determine whether signal sampling is early or late.

10. The analog baud rate clock and data recovery apparatus of claim 9, wherein the received signal is a low voltage differential signal (LVDS) or current mode logic signal (CML).

11. The analog baud rate clock and data recovery apparatus of claim 8, further comprising:
 a multiplexer for selecting between the comparators first or second timing error signal outputs according to a truth table;
 an XOR; and
 a valid vote check,
 wherein the multiplexer, the XOR and the valid vote check select the correct timing error signal.

12. The analog baud rate clock and data recovery apparatus of claim 9, wherein the received signal is a serialized signal that is serialized by a SERDES.

13. The analog baud rate clock and data recovery apparatus of claim 12, wherein the SERDES is implemented in combination with 8B/10B encoding.

14. The analog baud rate clock and data recovery apparatus of claim 12, wherein the SERDES is implemented in combination with 64B/66B encoding.

15. The analog baud rate clock and data recovery apparatus of claim 12, wherein the SERDES is implemented in combination with pseudo-random binary sequence (PRBS) scrambling.

16. The analog baud rate clock and data recovery apparatus of claim 8, wherein the unit interval is one half of a clock cycle.

17. A method of implementing an analog baud rate clock and data recovery apparatus comprising:
 receiving a signal for a main data path at a pair of track and hold circuits;
 delaying the signal by at least half a clock cycle in relation to each of the track and hold circuits in the pair creating an even and odd signal;
 receiving the even and odd signal from the pair of track and hold circuits at a first, second, third, and fourth comparator and the even signal at a first track and hold circuit and the odd signal at a second track and hold circuit;
 delaying the even and the odd signal at the first and second track and hold circuits respectively;
 receiving the delayed even and odd signals at the first, second, third, and fourth comparators;
 subtracting the odd signal to the delayed even signal and comparing against h(−1) threshold at the first comparator;
 adding the odd signal and the delayed even signal and comparing against h(−1) threshold at the second comparator;
 subtracting the delayed odd signal to the even signal and comparing against h(−1) threshold at the third comparator;
 adding the delayed odd signal and the even signal and comparing against h(−1) threshold at the fourth comparator; and
 deriving a timing error signal from the outputs of the comparators and using the timing error signal to tell the apparatus if signal sampling is early or late.

18. A method of implementing an analog baud rate clock and data recovery apparatus comprising:
 selecting two different clocks at one unit interval apart for two track and hold circuits;
 using a random number generator to select a difference in clock phase;
 receiving a signal from the main data path at a first and second track and hold circuits;
 aligning odd signal and even signals by applying clock signals with one unit interval difference;
 receiving the odd signal from the first track and hold at the first and second comparators and receiving the even signal from the second track and hold at the first and second comparator;
 adding the odd signal to the even signal and comparing against h(−1) threshold at the first comparator adds and outputting a first potential timing error;
 subtracting the odd signal and the even signal and comparing against h(−1) threshold at the second comparator and outputting a second potential timing error signal; and
 deriving a correct timing error signal and using the correct timing error signal to determine whether signal sampling is early or late.

* * * * *